United States Patent [19]

Timsit

[11] Patent Number: 5,190,596
[45] Date of Patent: Mar. 2, 1993

[54] METHOD OF BRAZING METAL SURFACES

[75] Inventor: Roland S. Timsit, Kingston, Canada

[73] Assignee: Alcan International Limited, Montreal, Canada

[21] Appl. No.: 823,291

[22] Filed: Jan. 21, 1992

Related U.S. Application Data

[63] Continuation-in-part of Ser. No. 646,151, Jan. 25, 1991, Pat. No. 5,100,048.

[51] Int. Cl.$^5$ ............................................. B23K 35/34
[52] U.S. Cl. ........................................ 148/23; 148/26
[58] Field of Search ................................. 148/23, 26

[56] References Cited

U.S. PATENT DOCUMENTS

| | | | |
|---|---|---|---|
| 2,981,648 | 4/1961 | Peterson et al. | 148/23 |
| 2,987,816 | 6/1961 | Noland et al. | 29/493 |
| 3,373,483 | 4/1968 | Miller | 29/501 |
| 3,461,462 | 8/1969 | Ruggiero | 29/492 |
| 3,971,501 | 7/1976 | Cooke | 228/248 |
| 4,235,649 | 11/1980 | Inamura et al. | 148/24 |
| 4,475,960 | 10/1984 | Yamawaki | 148/26 |
| 4,888,067 | 12/1989 | Sato | 148/26 |
| 4,901,909 | 2/1990 | George | 148/26 |
| 4,906,307 | 3/1990 | Fujiyoshi | 148/26 |

Primary Examiner—Peter D. Rosenberg
Attorney, Agent, or Firm—Cooper & Dunham

[57] ABSTRACT

A novel method is described for joining aluminum to metal surfaces by brazing. The method comprises (a) applying as a coating to at least one of the metal surfaces to be joined a mixture of a metal (e.g. Si, Cu or Ge) and a brazing flux, the metal of the mixture being adapted to form a brazable eutectic with one or both of the surface metals, (b) heating the surfaces and the coating in juxtaposed relation to a temperature above the brazing alloy melting point to thereby dissolve oxide film on the surfaces to be joined, cause the metal of the coating to dissolve into the oxide-free aluminum surface and form therewith a brazing alloy layer and form a brazed assembly and (c) cooling the brazed assembly to form a solidified joint between the surfaces. This has the advantage of providing for the joining of metal surfaces, such as aluminum, to aluminium, cooper, brass or steel surfaces, by brazing without the prior formation of a brazing alloy cladding on the surfaces to be brazed.

35 Claims, No Drawings

METHOD OF BRAZING METAL SURFACES

CROSS-REFERENCE TO A RELATED APPLICATION

This is a continuation-in-part of pending U.S. application Ser. No. 07/646,151, filed Jan. 25, 1991 now U.S. Pat. No. 5,100,048.

BACKGROUND OF THE INVENTION

This invention relates to a method of joining aluminum to metal surfaces, e.g. aluminum, copper, brass or steel surfaces, by brazing.

It is known to join aluminum components by disposing an aluminum brazing alloy between or adjacent the component surfaces to be joined, and heating the brazing alloy and the joining surfaces in appropriately assembled fashion to a temperature (brazing temperature) at which the brazing alloy melts while the components remain unmelted. Upon subsequent cooling, the brazing alloy forms a fillet or joint that bonds the joining surfaces of the components. For assured selective melting of only the brazing alloy in the heating step, it is commonly preferred that the melting point of the brazing alloy be at least 30° to 40° C. lower than that of the metal of the components. An example of a suitable aluminum brazing alloy is an Al-Si eutectic composition, which melts at about 577° C.

It is common practice to pre-clad at least one of the surfaces being joined with a layer of aluminum brazing alloy. Such pre-clad articles, generally known as brazing sheet, are relatively costly, and in many instances it is preferred to provide the brazing alloy in some form other than cladding. One known alternative is to apply the brazing alloy to or adjacent to one or both joining surfaces in powdered or particulate form carried in a suitable liquid or paste-like vehicle.

In U.S. Pat. No. 3,971,501 (Cooke) there is described a method of joining aluminum surfaces with an aluminum brazing alloy in which a mixture of the aluminum brazing alloy in powdered form and a powdered flux is coated on the surfaces to be joined. The coating is then dried and the surfaces are then heated to a brazing temperature whereby the brazing is completed. This procedure, like other known systems, utilizes a brazing alloy.

Although fluxless brazing procedures have been devised, their use is limited because of economic and other considerations arising from the special conditions and equipment required for successful practice of such procedures. It is, therefore, generally necessary to employ a flux in brazing aluminum, to remove the oxide ordinarily present on exposed metal surfaces at the location of the joint, as well as to promote flow of molten brazing alloy during the heating step. The material used as a flux must be capable of acting as a flux to dissolve and-/or otherwise remove the metal oxides at the brazing temperatures while remaining essentially inert with respect to the aluminum at such temperatures. Since fluxes are usually reactive only when at least partially molten, fluxes for aluminum brazing should as a practical matter be partly or wholly molten at brazing temperatures, e.g. at temperatures not substantially higher and preferably lower than 577° C.

Flux materials heretofore commercially employed in brazing aluminum have commonly been mixtures of predominantly chloride salts, with minor additives of fluoride in some cases. A recent highly successful flux for brazing aluminum is one sold under the trade mark NOCOLOK ®, which is essentially a potassium fluoroaluminate.

It is the object of the present invention to provide an improved method of joining aluminum surfaces, as well as joining aluminum to other surfaces such as copper, brass or steel, by brazing without the prior formation of a brazing-alloy cladding on the surfaces to be brazed.

SUMMARY OF THE INVENTION

According to the present invention, an improved method is provided for joining aluminum to metal surfaces with a brazing alloy having a melting point lower than that of the metal of the surfaces to be joined. The surfaces to be joined to the aluminum may be selected from aluminum, copper, brass or steel surfaces. Thus, the method of the invention may be used to join similar or different metals and may, for instance, be used to join aluminum to aluminum, or to copper, or to brass, or to steel. The method comprises (a) applying as a coating to at least one of the metal surfaces to be joined a mixture of a metal and a brazing flux, the metal of the mixture being adapted to form a brazable eutectic with at least one of the surface metals, (b) heating the surfaces and the coating in juxtaposed relation to a temperature above the melting point of both the flux and the brazing alloy to thereby dissolve or remove the oxide film on the surface to be joined, cause the metal of the coating to dissolve in the oxide free metal surface and form therewith a brazing alloy layer which melts and flows to the interface between the two workpieces to be joined to form the joint and thereby braze the assembly, the molten flux reducing the surface tension of the molten brazing alloy and promoting its flow into the interface, and (c) cooling the brazed assembly to form a solidified joint between the surfaces.

The coating mixture may be applied as a dry powder, a paste or a slurry, preferably in a volatile liquid carrier, which may be water-based or based on an organic compound such as alcohol.

The preferred metal component of the coating mixture is silicon but other metals such as copper or germanium may be used. In this specification and in the accompanying claims, the word "metal" refers to the elemental form of a metal, as commercially available in unalloyed form, which may include small concentrations of impurities which do not affect its characteristics. The main requirement is that there be present in the coating mixture a metal component which at brazing temperatures is capable of dissolving in the aluminum or other metal being joined and form in situ with the metal a layer of brazing alloy.

The flux component of the coating mixture may be any material capable of removing the oxide layer and which melts below 600° C. A preferred flux is a complex potassium fluoroaluminate. As herein used, potassium fluoroaluminate refers to materials containing the elements potassium, aluminum, and fluorine, in such proportions that compounds such as $KF$, $AlF_3$, $KAlF_4$, $K_2AlF_5$, $K_3AlF_6$ either singly, doubly or in combination are present. The composition can be expressed in terms of the elemental composition of 20 to 45% K; 10 to 25% Al, and 45 to 60% F; or in terms of the concentration of the compounds $KF$ and $AlF_3$, as 40 to 70% $AlF_3$ and 30 to 70% $KF$. Such fluxes have been described among others in British Patent No. 1,055,914 to Societe Des Soudures Castolin S.A., published on Jan. 18, 1967 for a combination containing 53-55% $AlF_3$ and 45-47% KF; and in U.S. Pat. No. 3,951,328 issued on Apr. 20, 1976 and assigned to Alcan Research and Development Limited for a combination of 45-65% AlF$_3$ and 35 to 55% KF, which provides for a mixture of K$_3$AlF$_6$ and KAlF$_4$ to give a mixture which melts around 577° C.

Other potassium fluoroaluminates having the desired flux properties is a mixture of 65.6 to 99.9% KAlF$_4$ and 34.4 to 0.1% K$_3$AlF$_6$, and yet another is described in European Patent Publication EP 0295541 published on Dec. 21, 1988 in the name of Showa Aluminum Corporation for a mixture prepared from 31.5 to 56.2% KF and 68.5 to 43.8% AlF$_3$. Still another description is in U.S. Pat. No. 4,579,605 issued on Apr. 1, 1986 and assigned to Furukawa Aluminum Co. Ltd. for a flux comprising one member chosen from the group K$_2$AlF$_5$ and K$_2$AlF$_5$.H$_2$O, the remainder being KF.

One example of a commercially sold potassium fluoroaluminate is Nocolok® flux, other potassium fluoroaluminates such as KAlF$_4$, K$_2$AlF$_5$, K$_3$AlF$_6$, and their mixtures; and potassium fluoroaluminate mixed with one or more of cesium chloride, rubidium chloride, lithium fluoride, cesium fluoride and other alkali halide salts to reduce the melting point of the flux. Other known aluminum brazing fluxes are: mixtures of alkali and alkaline earth chlorides and fluorides, ammonium chloride, ammonium fluoride, potassium acid fluoride (KHF$_2$), sodium acid fluoride (NaHF$_2$), ammonium acid fluoride (NH$_4$HF$_2$), zinc chloride, mixtures of zinc chloride, potassium acid fluoride and ammonium chloride and potassium fluoro-zirconate (K$_2$ZrF$_6$).

Yet another preferred flux is the flux disclosed in British patent application GB 2,241,513A published on Sep. 4, 1991 (the disclosure of which is incorporated herein by reference). This flux comprises cesium fluoride, aluminum fluoride, and a crystalline aluminum hydroxide or aluminum oxide or both, which form a crystalline compound having the following composition and containing cesium in the form of a complex salt:

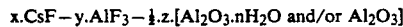

$$x \cdot \text{CsF} - y \cdot \text{AlF}_3 - \tfrac{1}{2} z \cdot [\text{Al}_2\text{O}_3 \cdot n\text{H}_2\text{O and/or Al}_2\text{O}_3]$$

wherein $x+y+z=100$, $x/y \leq 3$, $42 \leq x \leq 66$, and $z \geq 2$ in terms of mol. %. The value of n is any suitable value for water of crystallization of Al$_2$O$_3$. This crystalline compound has a melting point of 440°-580° C. This flux is non-corrosive and safe to use.

The metal component and flux are typically present in the mixture in a ratio (wt/wt) of metal component to flux in the range of 0.1:1 to 5:1, preferably 0.25:1 to 1:1.

The metal component of the coating mixture is preferably in the form of fine particles, e.g. ranging in dimensions up to about 1000 μm, preferably 4 to 80 μm, more preferably 5 to 50 μm.

According to a preferred embodiment, the coating mixture may also include a binder component so as to form a paste. This binder may be selected from a variety of binder materials which are capable of volatilizing below the melting point of the flux and the eutectic alloy. Examples of suitable binder materials include a mixture polyethylmethacrylate and butylacrylate or 1-(2-methoxy-1-methyloxy)-2-propanol and propylene glycol as the carrier, or 2-methyl-2,4-pentanediol.

The amount of coating mixture applied to the surface is usually less than 130 g/m$^2$, with a range of about 30 to 100 g/m$^2$ being preferred. When a binder is included in the mixture, as much as 130 g/m$^2$ can be applied. However, a mixture without a binder should not be applied in an amount above 100 g/m$^2$. It has been found to be particularly preferred to apply the coating mixture in an amount to provide 20 to 30 g/m$^2$ of the flux component on the surface.

When the metal component of the coating mixture is silicon particles and the metal being joined is aluminum, the joining procedure of the invention is preferably carried out at a temperature in the range of 500°-650° C. The quality of the braze, i.e. completeness of the braze, dimensions of the fillet, etc., depends upon the relative Si/flux content in the brazing mixture, and on the surface coverage by that mixture, and the length of time held at the brazing temperature.

The brazing occurs through the complementary actions of the flux material and the surface metal. The brazing temperature varies depending on the surface metal or metals being joined. For instance, aluminum surfaces may be brazed at temperatures in the range of 500°-650° C., and aluminum to copper at temperatures in the range of 570°-590° C.

When joining aluminum surfaces, the flux is molten at 600° C. and dissolves or removes the native oxide film on aluminum surfaces being joined, exposing fresh aluminum to the fine silicon powder. Because of the high solubility of silicon in aluminum at this temperature, the silicon dissolves rapidly into the exposed aluminum surface, forming a surface layer of Al/Si alloy with a composition believed to be close to the Si/Al eutectic of 12.6% Si/87.4% Al in each of the aluminum components. Since the melting point of this eutectic is only 577° C., the silicon-containing aluminum surfaces melt and flow at temperatures above 577° C. to fill the joint interface of interest. The molten flux reduces the surface tension of the molten Si/Al eutectic alloy, and draws the molten alloy into the joint interface thereby improving the quality of the brazed joint. It should be noted that the use of too large a quantity of silicon with the flux powder may preclude the generation of an aluminum surface alloy-layer of low melting point and high fluidity, and hence may preclude the formation of a satisfactory brazing fillet in the joint. Because the formation of the Al/Si eutectic alloy depends on diffusion of silicon into aluminum, the brazing process requires at a temperature above 577° C. a time interval sufficiently long for Si-diffusion and for the ensuing alloy-forming and fillet forming processes to occur. This time interval typically ranges from about 2 to 5 minutes, depending upon the dimensions of the fillet.

It has also been found that the quality of brazing fillets in joints fabricated from aluminum components containing alloying elements such as manganese, copper, etc., along with aluminum may be enhanced through the addition of traces of powders of these or other elements or alloys of these and of other elements in the coating mixture. The coating mixture can include powders of other metals, of the same particle size as that of the eutectic forming metal, to give joined parts with better properties. For example, the addition of copper powder to the coating mixture will lead to sufficient Cu diffusion into the joints, and more generally throughout the core alloy of the joined structure during brazing, to enhance the mechanical strength of the parent alloys. Additions of Fe, Mn, Ni and Zn powders to the coating mixture, either separately or in combination with each other, can generate superior mechanical strength, superior elevated temperature strength and/or superior heat treatability of the joined aluminum parts. Additions of Bi and Sr enhance the wettability properties of the eutectic liquid to the parent alloy during brazing. The corrosion resistance of the brazed components can be enhanced by additions of Mn, Cr, Sb, V or Zn powder. Additions of Zn may yield superior finish following an anodizing treatment. The weldability of the brazed assembly may be enhanced by additions of Be to the coating mixture.

The corrosion resistance of the aluminum joint brazed using the above mixture and the metal surrounding the joint may also be significantly enhanced by the inclusion of a galvanically sacrificial material such as zinc powder, or the like, in the brazing mixture. The quantity of this sacrificial material must be selected to satisfy the requirement of generating corrosion protection without degrading the overall quality of the braze.

DESCRIPTION OF THE PREFERRED EMBODIMENTS

By way of further illustration of the invention reference may be had to the following specific examples:

EXAMPLE 1

Two coupons of AA1100 aluminum alloy were used. These coupons were 25 mm wide, 28 mm long, and 1.3 mm thick.

A flux-silicon coating mixture was prepared by mixing together NOCOLOK® brazing flux and silicon metal powder having a typical particle size of about 30 μm. The flux and silicon were mixed in different proportions as indicated in the Table I below.

The flux-silicon coating mixture was slurried in isopropyl alcohol. It was applied to the surface of the coupons by dipping them into the slurry, withdrawing, and drying the coupons at 150° C. for five minutes. The two pieces were then assembled to form a "T", and heated in a brazing furnace in an atmosphere of nitrogen to a temperature of 600° C. The total time for the brazing operation was 12 minutes, with about a 3 minute interval at the maximum temperature of 560°-605° C.

The quality of the braze, in terms of the size and quality of the braze fillet, was noted. The results are shown in the following Table 1:

TABLE 1

| Carrier | Si/Flux (wt/wt) Ratio | Weight Applied Total g/m$^2$ | Flux g/m$^2$ | Si g/m$^2$ | Quality of Braze |
|---|---|---|---|---|---|
| None | 0.56 | 15.6 | 10 | 5.6 | Thin fillet formed |
| None | 1.23 | 21 | 9.4 | 11.6 | Excellent fillet |
| Isopropyl Alcohol | 0.5 | 10 | 6.7 | 3.3 | Partial Brazing |
| Isopropyl Alcohol | 0.25 | 9.6 | 7.7 | 1.9 | No Braze |

These test results indicated that a loading of 3.3 g/m$^2$ of Si powder was insufficient to effect brazing, but a loading of 11.6 g/m$^2$ was sufficient to give an excellent braze.

EXAMPLE 2

The use of water and isopropyl alcohol vehicles for the slurry were compared. It is known that isopropyl alcohol wets the surface of the aluminum without pre-cleaning being required because it penetrates through the oil and grease layer on the surface of the aluminum sheet. However, in industrial practice only the water vehicle system may be used. A test was therefore carried out to determine if the use of a water carrier can deposit sufficient flux and Si on the sheet surface to effect satisfactory brazing.

The flux/Si mixture was made up in various ratios of Si to flux, and this was made into varying concentrations of slurry as shown in TABLE 2.

The test specimen used in these tests was a small section of a typical aluminum heat exchanger, made up of two sheets of AA1100 sheet sandwiching a corrugated fin made of AA3003 alloy. None of this material was clad with the usual Al-11% Si brazing alloy. In the test, the alcohol carrier slurry was applied directly to the metal surface. The water carrier slurry was applied to the cleaned metal surface. The cleaning was done by immersing the test specimen in a 5% wt/wt solution of sodium hydroxide for 5 to 15 seconds, to ensure that there was good wetting of the surface by the water carrier slurry.

The slurry of flux/Si mixture was applied by immersing the test specimen in the slurry, withdrawing, and evaporating the carrier by drying the specimen at 150° C. for five minutes. The increase in weight of the specimen was measured, and from the increase in weight the amount of flux and silicon metal on the surface was calculated. The results are shown in TABLE 2.

These results indicate that adequate weights of Si metal and flux could be deposited from the water carrier slurry.

TABLE 2

| Slurry Conc. % wt Solid | Slurry Type | Dry Slurry Coating Weight | | | | | |
|---|---|---|---|---|---|---|---|
| | | Alcohol Carrier Si/Flux wt/wt Ratio | | | H$_2$O Carrier Si/Flux wt/wt Ratio | | |
| | | 1:1 | 1:2 | 1:3 | 1:2.8 | 1:3.3 | 1:4 |
| 20 | Si (g/m$^2$) | 2.5 | 1.7 | 1.2 | — | — | — |
| | Flux (g/m$^2$) | 2.5 | 3.4 | 3.4 | — | — | — |
| | Total (g/m$^2$) | 5.0 | 5.1 | 4.6 | — | — | — |
| 30 | Si (g/m$^2$) | 3.9 | 2.7 | 2.1 | — | — | — |
| | Flux (g/m$^2$) | 3.9 | 5.4 | 6.3 | — | — | — |
| | Total (g/m$^2$) | 7.8 | 8.1 | 8.4 | — | — | — |
| 40 | Si (g/m$^2$) | 6.4 | 4.6 | 4.5 | 7.0 | 6.5 | 4.3 |
| | Flux (g/m$^2$) | 6.4 | 9.3 | 13.4 | 19.5 | 21.5 | 17.1 |
| | Total (g/m$^2$) | 12.8 | 13.9 | 17.9 | 26.5 | 28.0 | 21.4 |

EXAMPLE 3

Test specimens were prepared by the procedure described in Example 2. A mixture of flux and silicon was applied from an isopropyl alcohol carrier slurry, using three different slurry concentrations at 20, 30 and 40% by wt. solids, to give different weights of coatings of Si and flux, as indicated in TABLE 3.

The specimen was dipped into the slurry, and the carrier was removed by drying at 150° C. for five minutes. The specimens were then brazed at three different final temperatures, 585°, 590°, and 600° C., in an atmosphere of nitrogen, following the same procedure given in Example 1.

TABLE 3

| Si/Flux Alcohol Braze System; Visual Fillet Size Assessment | | | | | | | | | |
|---|---|---|---|---|---|---|---|---|---|
| Slurry Concentration | | 20% wt solids | | | 30% wt solids | | | 40% wt solids | |
| Temp °C. | Si:Flux Ratio | 1:1 | 1:2 | 1:3 | 1:1 | 1:2 | 1:3 | 1:1 | 1:2 | 1:3 |
| 600 | Si (g/m$^2$) | 2.6 | 1.9 | 1.3 | 3.9 | 3.1 | 2.2 | 6.5 | 4.7 | 4.5 |
| | Flux (g/m$^2$) | 2.6 | 3.8 | 3.9 | 3.9 | 6.2 | 6.6 | 6.5 | 9.4 | 13.5 |
| | Fillet Quality | A | A | B | A | B | C* | A | A | B |
| 590 | Si (g/m$^2$) | 2.4 | 1.6 | .9 | 3.9 | 2.3 | 2.1 | 6.6 | 4.1 | 4.5 |

TABLE 3-continued

Si/Flux Alcohol Braze System;
Visual Fillet Size Assessment

| Slurry Concentration | | 20% wt solids | | | 30% wt solids | | | 40% wt solids | | |
| --- | --- | --- | --- | --- | --- | --- | --- | --- | --- | --- |
| Temp °C. | Si:Flux Ratio | 1:1 | 1:2 | 1:3 | 1:1 | 1:2 | 1:3 | 1:1 | 1:2 | 1:3 |
| 585 | Flux (g/m$^2$) | 2.4 | 3.1 | 2.5 | 3.9 | 4.6 | 6.3 | 6.6 | 8.3 | 13.3 |
|  | Fillet Quality | B | C | D | A | D | D | A | A | A |
|  | Si (g/m$^2$) | 2.4 | 1.6 | 1.3 | 4.0 | 2.7 | 2.0 | 6.0 | 5.1 | 4.4 |
|  | Flux (g/m$^2$) | 2.4 | 3.3 | 3.9 | 4.0 | 5.4 | 6.0 | 6.0 | 10.0 | 13.3 |
|  | Fillet Quality | D | D | D | A | C | C | C | B | A |

Fillet Description
A - Continuous/large
B - Continuous/moderate
C - Continuous/small
D - Discontinuous/very small
*Anomaly The above results indicate the range of flux and metal that give satisfactory results:

At 600° C. brazing temperature, satisfactory results are obtained with as little as 1.3 g/m$^2$ of Si, and a Si:Flux ratio of 1:3. For Si:Flux ratios larger than 1:3, satisfactory fillets are obtained with 2 to 6.5 g/m$^2$ of Si.

At 590° C. brazing temperature, satisfactory results are obtained with as little as 2.4 g/m$^2$ of Si, provided that Si:Flux ratio is 1:1.

At 585° C. brazing temperature, satisfactory results are obtained with approximately 4.0 g/m$^2$ of Si, and a Si:Flux ratio of 1:1.

Thus, at higher brazing temperatures, smaller concentrations of Si are required to obtain satisfactory brazing.

EXAMPLE 4

The specimens were prepared according to the procedure of Example 2. The mixture of silicon and NOCOLOK ® flux was applied from a water carrier slurry; the solids concentration was 40% by wt.

The brazing was carried out at 600° C., and the quality of the braze was visually assessed, the results are given in Table 4.

TABLE 4

Si/Flux Alcohol Braze System;
Visual Fillet Size Assessment

| Slurry Concentration | | 40% wt solids | | |
| --- | --- | --- | --- | --- |
| Temp. °C. | Si:Flux Ratio | 1:2.8 | 1:3.3 | 1:4 |
| 600 | Si (g/m$^2$) | 7.0 | 6.5 | 4.3 |
|  | Flux (g/m$^2$) | 19.5 | 21.5 | 17.1 |
|  | Fillet Quality | A | B | C |

Fillet Description
A - Continuous/large
B - Continuous/moderate
C - Continuous/small These results indicate that a loading of 7.0 g/m$^2$ of Si is required to obtain consistently good braze fillet, and that 4.30 g/m$^2$ is insufficient when the Si/Flux ratio is smaller than 1:3.3.

EXAMPLE 5

This is an example of the improvement in corrosion resistance obtained by adding zinc metal powder to a NOCOLOK ®/Si powder mixture.

The flux metal mixture comprised:
1 part Zn powder, (99.9% pure, about 8 micron size)
1 part Si powder, (99.1% pure, about 44 micron size)
4 parts NOCOLOK ® flux This was slurried in sufficient water to give 40% solids.

The flux/metal mixture was applied to 1"×1½" coupons of AA1100 and AA3003 previously cleaned by immersion in 5% by wt solution of sodium hydroxide, by dipping them into the slurry, and drying. The resulting loading was 4.3 g/m$^2$ of Si, 4.5 g/m$^2$ of Zn and 17.2 g/m$^2$ of NOCOLOK ® flux.

The coupons were assembled into a "T" joint and brazed by heating to 600° C. under a nitrogen atmosphere.

The coupons were cut up, and a cross section of the braze was examined by a scanning electron microscope. This indicated that there was diffusion of the Zn into the aluminum alloy to a depth of at least 50 microns, and that almost all of the Si had reacted with the Al to make an Al-11% Si eutectic alloy.

Subsequently, the coupons were subjected to a corrosion test and compared with those made by the usual NOCOLOK ® brazing process, without either Si or Zn added to the flux. The results of the corrosion test showed that the addition of Zn to the flux did not adversely affect the Si diffusion process and the corrosion resistance of the coupons.

EXAMPLE 6

The process of the invention may also be used for joining aluminum to copper. For this test a lap joint configuration was used consisting of a base plate measuring 63 mm×50 mm with a 25 mm×75 mm coupon which overlapped the base plate by 50 mm. The aluminum component (AA1100) was cleaned in 5% W/W 65° C. sodium hydroxide solution, desmutted in 50% nitric acid, water rinsed and forced air dried. The copper component was cleaned for one minute in 50% nitric acid, water rinsed and forced air dried.

The experimental conditions are shown in Table 5 below.

TABLE 5

| Sample Configuration | Slurry Concentration* (% Total Solids) | Total Loading (g/m$^2$) | Si Loading (g/m$^2$) | Flux Loading (g/m$^2$) | Max. Temperature Reached (°C.) |
| --- | --- | --- | --- | --- | --- |
| Cu coupon/ Al base | 50 | 44.3 | 11.1 | 33.3 | 584 |
| Al coupon/ Cu base | 50 | 56.4 | 14.1 | 42.3 | 576 |
| Al coupon/ Cu base | 30 | 32.9 | 8.2 | 24.7 | 580 |

*Only the underside of the coupon was coated with (flux + Si); the base was not coated.

The copper coupon/aluminum base assembly which reached 584° C. showed that joining did occur, but there was significant erosion of the aluminum base around the edges of the copper coupon. An aluminum coupon/copper base assembly that reached 576° C. did not braze, probably because the temperature was insufficient. Brazing with a lower Si coating weight (8.2 g/m$^2$) also resulted in successful brazing.

It is to be understood that the invention is not limited to the features and embodiments hereinabove specifically set forth but may be carried out in other ways without departure from its spirits.

I claim:

1. A method of joining an aluminum surface to a metal surface selected from aluminum, copper, brass and steel surfaces with a brazing alloy having a melting point lower than that of the metal(s) of the surfaces to be joined, comprising:

(a) applying as a coating to at least one of the metal surfaces to be joined a mixture of a metal and a brazing flux capable of removing an oxide layer formed on said surfaces and which melts below 600° C., said metal of said mixture being adapted to form a brazable eutectic alloy with at least one of the surface metals;

(b) heating said surfaces and said coating, in juxtaposed relation, to a temperature above the melting point of both the brazing flux and the brazable eutectic alloy to thereby remove oxide film from said surfaces to be joined, cause said metal of said mixture to dissolve into the oxidefree metal surface and form therewith a brazing alloy layer and form a brazed assembly; and (c) cooling the brazed assembly to form a solidified brazed joint between the surfaces.

2. A method according to claim 1 wherein the mixture of metal and brazing flux is applied as a dry powder.

3. A method according to claim 1 wherein the mixture of metal and brazing flux is applied as a slurry.

4. A method according to claim 3 wherein the slurry includes a volatile liquid carrier.

5. A method according to claim 1 wherein the mixture of metal and brazing flux is applied as a paste containing an organic or inorganic binder.

6. A method according to claim 1 wherein the metal of the coating mixture is selected from the group consisting of silicon, copper and germanium.

7. A method according to claim 1 wherein the metal of the coating mixture is silicon.

8. A method according to claim 1 wherein the brazing flux has an elemental composition of: 20 to 45% K; 10 to 25% Al; and 45 to 60% F.

9. A method according to claim 1 wherein the brazing flux has a composition, expressed in terms of the equivalent simplest compounds, of 40 to 70% AlF$_3$ and 30 to 60% KF.

10. A method according to claim 6 wherein the brazing flux is a potassium fluoroaluminate flux.

11. A method according to claim 1 wherein the mixture of metal and brazing flux additionally contains at least one other powered material which modifies the nature of at least one of the brazed joint and the metal surrounding the brazed joint.

12. A method according to claim 11 wherein said at least one other powdered material is a powder of at least one metal selected from the group consisting of Be, Cu, Fe, Mn, Ni, Zn, Bi, Sr, Cr, Sb and V.

13. A method according to claim 1 wherein the mixture of metal and brazing flux additionally contains an alkali metal salt which lowers the melting point of the flux.

14. A method according to claim 6 wherein the ratio wt/wt of the metal to flux in the coating mixture is in the range of 0.1:1 to 5:1.

15. A method according to claim 6 wherein the surfaces being joined are both aluminum surfaces and these are heated to a temperature in the range of 500°-650° C.

16. A method according to claim 6 wherein the surfaces being joined are an aluminum surface and a copper surface and these are heated to a temperature in the range of 570°-590° C.

17. A method according to claim 6 wherein the eutectic forming metal has particle sizes of up to 1000 μm.

18. A method according to claim 17 wherein the particle sizes are in the range of 5 to 50 μm.

19. A method according to claim 14 wherein the flux component is applied to the surface in an amount of 10 to 30 g/m$^2$.

20. A coating mixture for use in joining an aluminum surface to a metal surface selected from aluminum, copper, brass and steel surfaces, said coating mixture comprising;
(i) a metal being capable of forming in situ a brazable eutectic alloy with at least one of said surface metals; and
(ii) a brazing flux capable of removing an oxide layer from said metal surfaces.

21. A mixture according to claim 20 wherein said metal capable of forming said alloy is selected from the group consisting of silicon, copper and germanium.

22. A mixture according to claim 20 which also includes a binder capable of volatilizing at a temperature below the melting point of the flux and the eutectic alloy.

23. A mixture according to claim 20 wherein the brazing flux has an elemental composition of: 20 to 45% K; 10 to 25% Al; and 45 to 60% F.

24. A mixture according to claim 20 wherein the brazing flux has a composition, expressed in terms of the equivalent simplest compounds, of 40 to 70% AlF$_3$ and 30 to 60% KF.

25. A mixture according to claim 20 wherein the brazing flux is a potassium fluoroaluminate flux.

26. A mixture according to claim 20 which additionally contains at least one other powdered material which, in use, modifies the nature of at least one of the brazed joint and the metal surrounding the brazed joint.

27. A mixture according to claim 26 wherein said at least one other powdered material is a powder of at least one metal selected from the group consisting of Be, Cu, Fe, Mn, Ni, Zn, Bi, Sr, Cr, Sb and V.

28. A mixture according to claim 20 which additionally contains an alkali metal salt which lowers the melting point of the flux.

29. A mixture according to claim 21 wherein the ratio wt/wt of the metal to flux in the coating mixture is in the range of 0.1:1 to 5:1.

30. A mixture according to claim 22 in the form of a paste.

31. A non-brazed composite comprising a metal substrate surface selected from aluminum, copper, brass and steel surfaces, coated with a layer of a coating mixture comprising;
(i) a metal being capable of forming in situ a brazable eutectic alloy with at least one of said surface metals; and
(ii) a brazing flux capable of removing an oxide layer from said metal surfaces.

32. A composite according to claim 31 wherein said metal capable of forming said alloy is selected from the group consisting of silicon, copper and germanium.

33. A composite according to claim 31 wherein the coating mixture also includes a binder capable of volatilizing at a temperature below the melting point of the flux and the eutectic alloy.

34. A method according to claim 1 wherein the brazing flux comprises cesium fluoride, aluminum fluoride and at least one compound selected from the group consisting of crystalline aluminum hydroxide and crystalline aluminum oxide, which form a crystalline compound having the following composition and containing cesium in the form of a complex salt:

$x \cdot CsF - y \cdot AlF_3 - \frac{1}{2} \cdot z \cdot [Al_2O_3 \cdot nH_2O \text{ and/or } Al_2O_3]$ wherein
$x + y + z = 100$
$x/y \leq 3$
$42 \leq x \leq 66$, and
$z \leq 2$
in terms of mol. %.

35. A mixture according to claim 20 wherein said brazing flux comprises cesium fluoride, aluminum fluoride and at least one compound selected from the group consisting of crystalline aluminum hydroxide and crystalline aluminum oxide, which form a crystalline compound having the following composition and containing cesium in the form of a complex salt:

$x \cdot CsF - y \cdot AlF_3 - \frac{1}{2} \cdot z \cdot [Al_2O_3 \cdot nH_2O \text{ and/or } Al_2O_3]$ wherein
$x + y + z = 100$
$x/y \leq 3$
$42 \leq x \leq 66$, and
$z \geq 2$
in terms of mol. %.

* * * * *